(12) United States Patent
Haley et al.

(10) Patent No.: US 8,639,082 B2
(45) Date of Patent: Jan. 28, 2014

(54) FIBER OPTIC CABLE ASSEMBLY

(75) Inventors: Edmund J. Haley, Dillsburg, PA (US); David R. Baechtle, Dillsburg, PA (US); Alexander F. Waardenburg, Mechanicsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 259 days.

(21) Appl. No.: 13/090,041

(22) Filed: Apr. 19, 2011

(65) Prior Publication Data

US 2012/0269485 A1    Oct. 25, 2012

(51) Int. Cl.
*G02B 6/00* (2006.01)
*G02B 6/26* (2006.01)
*G02B 6/42* (2006.01)

(52) U.S. Cl.
USPC .............. 385/136; 385/32; 385/134; 385/137

(58) Field of Classification Search
USPC ............................................ 385/136–137, 32
See application file for complete search history.

(56) References Cited

U.S. PATENT DOCUMENTS

| | | | | |
|---|---|---|---|---|
| 5,037,175 A | * | 8/1991 | Weber .............................. | 385/76 |
| 5,748,819 A | * | 5/1998 | Szentesi et al. ................. | 385/60 |
| 6,634,801 B1 | * | 10/2003 | Waldron et al. ................. | 385/86 |
| 6,816,661 B1 | * | 11/2004 | Barnes et al. .................. | 385/134 |
| 6,916,014 B1 | * | 7/2005 | Thomas ................. | 254/134.3 R |
| 7,001,081 B2 | * | 2/2006 | Cox et al. ......................... | 385/86 |
| 7,490,997 B2 | | 2/2009 | Verhagen | |
| 7,677,812 B2 | * | 3/2010 | Castagna et al. ................ | 385/69 |
| 7,789,547 B2 | * | 9/2010 | Holder et al. ................. | 362/581 |
| 2012/0269485 A1 | * | 10/2012 | Haley et al. ..................... | 385/78 |

OTHER PUBLICATIONS

AFL, www.AFLglobal.com, "Optical Connectivity, Bendable Boot Jumpers" © 2011, AFL, Revision 0, Feb. 17, 2011, United States.

* cited by examiner

*Primary Examiner* — Rhonda Peace

(57) ABSTRACT

A fiber optic cable assembly includes a connector that has a mating end and a cable end. A fiber optic cable is terminated to the cable end of the connector. A cable director is coupled to the fiber optic cable rearward of the connector. The cable director includes a flexible support sleeve and a clip extending from the support sleeve. The support sleeve includes a raceway that receives the fiber optic cable. The support sleeve has a first end segment and a second end segment. The support sleeve has a first attachment point proximate to the first end segment and a second attachment point proximate to the second end segment. The support sleeve is held in a bent shape when the clip is attached to both the first attachment point and the second attachment point. The support sleeve is configured to be straightened to a loading position in which the raceway is substantially linear when the clip is removed from at least one of the first or second attachment points.

19 Claims, 4 Drawing Sheets

FIBER OPTIC CABLE ASSEMBLY

BACKGROUND OF THE INVENTION

The subject matter herein relates generally to fiber optic cables, and more particularly to cable directors for fiber optic cables.

Fiber optic cables are used in many applications that require routing of the cables between various components. For example, a fiber optic cable may be terminated in a cabinet and routed from the cabinet to another device. The fiber optic cable may be required to be bent at approximately 90° shortly after the termination point at the cabinet. Care should be given to the cable routing, bending or flexing to minimize the possibility of such routing violating a minimum bend radius of the fiber optic cable.

One commonly used method of preventing excessive bending is to employ a bend limiter. The bend limiter is attached to a rear portion of the fiber optic connector that terminates the cable. The bend limiter serves as a mechanical means of preventing the cable from bending too sharply. The bend limiter defines a guide path for the fiber optic cable to bend around and ensure the bend of the fiber optic cable does not exceed the minimum acceptable bend radius. Such bend limiters are typically open ended channels that receive the fiber optic cable. Known bend limiters are not without disadvantages. For example, the bend limiters merely support the fiber optic cable and provide little or no strain relief for the fiber optic cable at the termination point with the connector. Some known systems utilize strain relief boots that provide strain relief for the termination between the fiber optic cable and the connector. The strain relief boots are bent along a certain radius of curvature that does not violate the minimum bend radius of the fiber optic cable. However, such strain relief boots are not without disadvantages. For example, the strain relief boots have a predetermined curvature. Lacing of the fiber optic cable through the strain relief boot can be difficult and time consuming to push the fiber optic cable through the radius of curvature. Additionally, once the curved strain relief boot is mounted to the fiber optic cable, it becomes difficult or impossible to pass the cable through piping or conduits, such as those run between floors of a building to feed the fiber optic cables between the floors. For example, for cables that have a 1" minimum bend radius, the size of the conduit needs to be significantly wider, such as 1.5" conduit diameter just to pass the fiber optic cable through the conduit. When other fiber optic cables are in the conduit, the conduit may need to be even larger.

Accordingly, a need remains for a cable director that is easy to assemble to a fiber optic cable and that provides strain relief.

BRIEF DESCRIPTION OF THE INVENTION

In one embodiment, a fiber optic cable assembly is provided having a connector that has a mating end and a cable end. A fiber optic cable is terminated to the cable end of the connector. A cable director is coupled to the fiber optic cable rearward of the connector. The cable director includes a flexible support sleeve and a clip extending from the support sleeve. The support sleeve includes a raceway that receives the fiber optic cable. The support sleeve has a first end segment and a second end segment. The support sleeve has a first attachment point proximate to the first end segment and a second attachment point proximate to the second end segment. The support sleeve is held in a bent shape when the clip is attached to both the first attachment point and the second attachment point. The support sleeve is configured to be straightened to a loading position in which the raceway is substantially linear when the clip is removed from at least one of the first or second attachment points.

In another embodiment, a fiber optic cable assembly is provided including a connector having a mating end and a cable end. A fiber optic cable is terminated to the cable end of the connector. A cable director is coupled to the fiber optic cable rearward of the connector and has a flexible support sleeve and a clip extending from the support sleeve. The support sleeve includes a raceway that receives the fiber optic cable. The support sleeve is movable between a loading position and a holding position. The raceway is substantially linear in the loading position and is bent at an angle in the holding position. The clip is movable between an engaged position and a disengaged position. The clip retains the support sleeve in the holding position when in the engaged position.

In a further embodiment, a cable director for a fiber optic cable is provided having a flexible support sleeve including a raceway configured to receive the fiber optic cable. The support sleeve has a first end segment and a second end segment. The support sleeve has a first attachment point proximate to the first end segment and a second attachment point proximate to the second end segment. A clip extends from the support sleeve and holds the support sleeve in a bent shape when the clip is attached to both the first attachment point and the second attachment point. The support sleeve is configured to be straightened to a loading position in which the raceway is substantially linear when the clip is removed from at least one of the first or second attachment points.

DETAILED DESCRIPTION OF THE INVENTION

Figure 1:
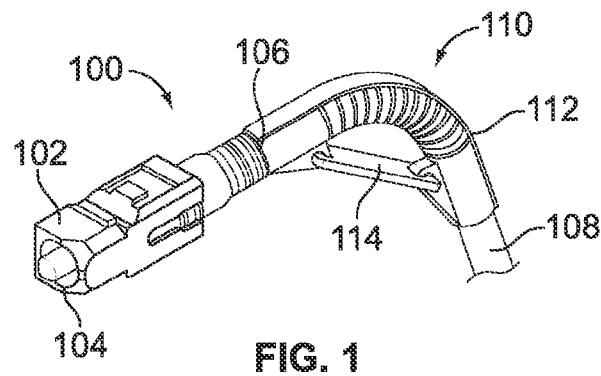
FIG. 1 illustrates a fiber optic cable assembly formed in accordance with an exemplary embodiment.

FIG. 1 illustrates a fiber optic cable assembly 100 formed in accordance with an exemplary embodiment. The fiber optic cable assembly 100 includes a connector 102 having a mating end 104 and a cable end 106. The fiber optic cable assembly 100 also includes a fiber optic cable 108 terminated to the cable end 106 of the connector 102. The fiber optic cable assembly 100 includes a cable director 110 coupled to the fiber optic cable 108 rearward of the connector 102. In the illustrated embodiment, the cable director 110 is coupled to the fiber optic cable 108 immediately adjacent the cable end 106 of the connector 102. The cable director 110 abuts the cable end 106 of the connector 102. Other components may be positioned between the cable director 110 and the connector 102 in alternative embodiments. The cable director 110 may be spaced apart from the connector 102 in alternative embodiments.

The cable director 110 includes a flexible support sleeve 112 and a clip 114 extending from the support sleeve 112. The fiber optic cable 108 extends through the support sleeve 112. The cable director 110 holds the fiber optic cable 108 in a bent shape. Optionally, the cable director 110 may hold the fiber optic cable 108 along a predetermined bend, such as approximately a 90° bend, an 80° bend, a 70° bend a 100° bend or another predetermined bend angle. Optionally, the cable director 110 may be configurable such that the cable director 110 may be configured to be fixed at many different predetermined angles by providing different attachment points or other features that hold the cable director 110 at more than one angle. The cable director 110 serves as a mechanical means of preventing the fiber optic cable 108 from bending too sharply. The cable director 110 operates as a bend limiter to limit the radius of curvature of the fiber optic cable 108. The cable director 110 securely holds the fiber optic cable 108 therein. Optionally, the cable director 110 may engage the outer circumference of the fiber optic cable 108. The cable director 110 may operate as a cable strain relief by reducing or eliminating strains between the connector 102 and the fiber optic cable 108.

In an exemplary embodiment, during assembly, the cable director 110 may be straightened such that the support sleeve 112 follows a generally straight path. The support sleeve 112 may be straightened out by disengaging the clip 114 from the support sleeve 112. When the support sleeve 112 is straightened, the fiber optic cable 108 may be fed directly through the support sleeve 112. Once the support sleeve 112 is loaded on the fiber optic cable 108, the fiber optic cable 108 may be terminated to the connector 102. The support sleeve 112 may be secured to the fiber optic cable 108 behind the connector 102. The support sleeve 112 may then be bent into the bent shape, such as the shape illustrated in FIG. 1, and held in the bent shape by the clip 114. Having the support sleeve 112 movable to a straight or linear shape, allows easy feeding of the fiber optic cable 108 through the support sleeve 112.

During use, once the cable director 110 is loaded onto the fiber optic cable 108, the fiber optic cable 108 may be routed along a cable path, such as to a desired location, such as an equipment rack. The fiber optic cable 108 and cable director 110 may be routed or loaded through conduits, such as conduits extending between floors of a building, with the cable director 110 in a straight shape. Once positioned at the end use point, such as the equipment rack, the cable director 110 may be bent into the bent shape and held by the clip 114. The fiber optic cable 108 and cable director 110 may be easily routed, without requiring large conduits to pass through because the cable director 110 is generally straight when the fiber optic cable 108 is routed.

Figure 2:
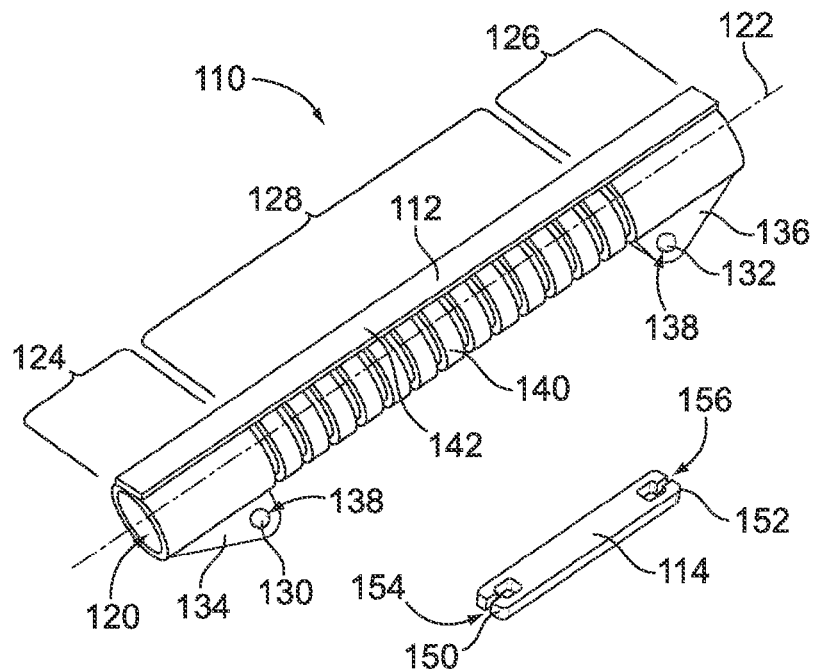
FIG. 2 is a perspective view a cable director for the fiber optic cable assembly shown in FIG. 1.

FIG. 2 is a perspective view of the cable director 110. In the illustrated embodiment, the clip 114 is separate from, and completely detached from, the support sleeve 112. The support sleeve 112 includes a raceway 120 extending through the support sleeve 112. The raceway 120 extends along a central longitudinal axis 122 between a first end segment 124 and a second end segment 126 of the support sleeve 112 at opposite ends of the support sleeve 112.

The support sleeve 112 is illustrated in a loading position, in which the support sleeve 112 is generally straight and has a cylindrical shape. In the loading position, the central longitudinal axis 122 extends along a generally linear path. In the loading position, the first end segment 124 and the second end segment 126 are generally parallel to one another and face in opposite directions. In the loading position, the support sleeve 112 is configured to receive the fiber optic cable 108 for loading the fiber optic cable 108 through the support sleeve 112. The fiber optic cable 108 may be passed straight through the support sleeve 112, such as by loading the fiber optic cable 108 through the second end segment 126 and pushing the fiber optic cable 108 through the intermediate segment 128 and out of the support sleeve 112 through the first end segment 124.

In an exemplary embodiment, the support sleeve 112 includes a first attachment point 130 proximate to the first end segment 124 and a second attachment point 132 proximate to the second end segment 126. The clip 114 is configured to be attached to the support sleeve 112 at the first and second attachment points 130, 132. In the illustrated embodiment, the support sleeve 112 includes a first tab 134 extending outward from the support sleeve 112 proximate to the first end segment 124. The first attachment point 130 is defined by and/or included on the first tab 134. The support sleeve 112 includes a second tab 136 extending from the support sleeve 112 proximate to the second end segment 126. The second attachment point 132 is defined by and/or provided on the second tab 136. In the illustrated embodiment, the first and second tabs 134, 136 have generally triangular shapes extending from a common side of the support sleeve 112. The first and second tabs 134, 136 include dimples 138 on one or both sides thereof. The dimples 138 define the first and second attachment points 130, 132. The clip 114 is configured to be attached to the support sleeve 112 at the dimples 138.

In alternative embodiments, the first and second tabs 134, 136 may have different shapes and/or may include different features for securing the clip 114 thereto. For example, rather than dimples, the first and second tabs 134, 136 may include openings are protrusions that are received in corresponding dimples or openings in the clip 114. Other types of securing features may be used in alternative embodiments.

In the illustrated embodiment, the support sleeve 112 includes an inner conduit 140 and an outer sleeve 142 surrounding the inner conduit 140. A portion of the outer sleeve 142 has been removed for clarity to show the inner conduit 140. The inner conduit 140 includes a plurality rings or ribs defining the intermediate segment 128. The ribs are held spaced apart by the outer sleeve 142 and allow the support sleeve 112 to be bent into the bent shape. The intermediate segment 128 may be bent or otherwise manipulated to provide the flexibility for the support sleeve 112 and allow the support sleeve 112 to be bent into the bent shape (shown in FIG. 3). In an exemplary embodiment, the inner conduit 140 is manufactured from a metal material and the outer sleeve 142 is manufactured from a plastic or synthetic material, such as rubber. Rather than the ribs, the inner conduit 140 may be defined by a helical coil. In other alternative embodiments, the support sleeve 112 may be manufactured without the inner conduit 140. For example, the support sleeve 112 may be manufactured from rubber material or a plastic material that is elastic and configured to be bent into the bent shape. The outer sleeve 142 may include grooves or slits in the sides that allow the outer sleeve 142 to be bent into the bent shape.

The clip 114 includes a body extending between a first end 150 and a second end 152. The clip 114 includes one or more attachment features 154 at the first end 150 and one or more attachment features 156 at the second end 152. The attachment features 154, 156 interface with the support sleeve 112 at the first and second attachment points 130, 132, respectively, to secure the clip 114 to the support sleeve 112. In the illustrated embodiment, the attachment features 154, 156 constitute fingers that face inward and are configured to be received in the dimples 138 to secure the clip 114 to the first and second tabs 134, 136. The fingers pinch the first and second tabs 134, 136 therebetween. Other types of attachment features may be utilized in alternative embodiments to secure the clip 114 to the support sleeve 112. Optionally, the second end 152 of the clip 114 may be permanently attached to the support sleeve 112 at the second attachment point 132. The first end 150 of the clip 114 may be removably attached to the first attachment point 130. When the first end 150 is engaged, the support sleeve 112 is held in the bent shape. When the first end 150 is disengaged, the support sleeve 112 may be straightened.

Figure 3:
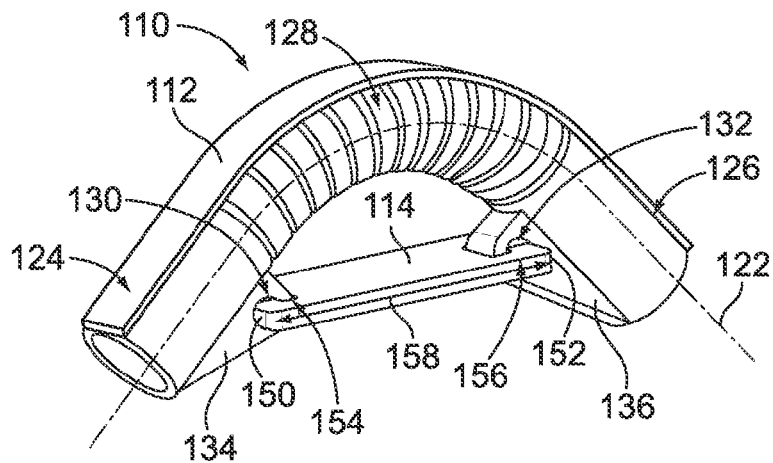
FIG. 3 is a perspective view of a cable director showing the cable director in an assembled state.

FIG. 3 is a perspective view of the cable director 110 showing the clip 114 in an engaged position. In the engaged position, the first and second ends 150, 152 of the clip 114 are attached to the support sleeve 112. The attachment features 154 engage the support sleeve 112 at the first attachment point 130. The attachment features 156 engage the support sleeve 112 at the second attachment point 132. The clip 114 is used to hold the support sleeve 112 in the bent shape. When the support sleeve 112 is bent, the intermediate segment 128 is curved along the radius of curvature. The radius of curvature may be controlled by a length 158 of the clip 114. For example, a longer length 158 may correspond with a broader radius of curvature, whereas a shorter length 158 may correspond with a tighter or narrower radius of curvature.

In the bent shape, the first end segment 124 is angled with respect to the second end segment 126. The central longitudinal axis 122 at the first end segment 124 is non-parallel to the central longitudinal axis 122 at the second end segment 126. In the illustrated embodiment, the first end segment 124 and the second end segment 126 are oriented at generally right angles with respect to one another. The intermediate segment 128 transitions approximately 90° such that the first end segment 124 is generally perpendicular with respect to the second end segment 126. The clip 114 holds the relative position of the first end segment 124 with respect to the second end segment 126. In the illustrated embodiment, both the first end 150 and the second end 152 of the clip 114 may be removed from the first and second tabs 134, 136, respectively. Alternatively, the clip 114 may be disengaged from the support sleeve 112 by removing only one of the first end 150 or the second end 152 from the corresponding first tab 134 or second tab 136. In some alternative embodiments, the second end 152 of the clip 114 defines a fixed end that is permanently attached to the second tab 136. The first end 150 of the clip 114 defines a free end that may be removably coupled to the first tab 134. In the engaged position the first end 150 is attached to the first tab 134. In the disengaged position, the first end 150 is uncoupled or disengaged from the first tab 134 allowing the first end segment 124 to be bent to a generally straight shape, thus returning the support sleeve 112 to the loading position.

Figure 4:
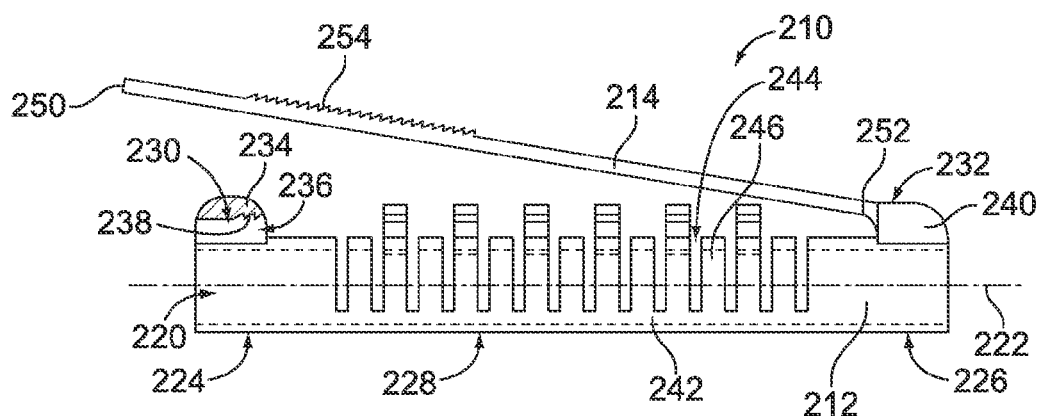
FIGS. 4-10 illustrate alternative cable directors for use with the fiber optic cable assembly of claim 1.

FIG. 4 is a side view of an alternative cable director 210. The cable director 210 includes a flexible support sleeve 212 and a clip 214 extending from the support sleeve 212. The support sleeve 212 is movable between a straight position (shown in FIG. 4) and a bent position (not shown). In the straight position, a fiber optic cable (not shown) is configured to be drawn through the support sleeve 212. In the bent position, the support sleeve 212 is bent at an angle, such as a 90° angle. The clip 214 is used to hold the support sleeve 212 in the bent shape.

In the illustrated embodiment, the clip 214 is integrally formed with the support sleeve 212. For example, the clip 214 and the support sleeve 212 may be molded during a common molding process. The support sleeve 212 includes a raceway 220 (shown in phantom) extending through the support sleeve 212. The raceway 220 extends along a central longitudinal axis 222 between a first end segment 224 and a second end segment 226 of the support sleeve 212 at opposite ends of the support sleeve 212. An intermediate segment 228 extends between the first and second end segments 224, 226.

The support sleeve 212 is illustrated in a loading position, in which the support sleeve 212 is generally straight and has a cylindrical shape. In the loading position, the central longitudinal axis 222 extends along a generally linear path. The fiber optic cable may be passed straight through the support sleeve 212.

In an exemplary embodiment, the support sleeve 212 includes a first attachment point 230 proximate to the first end segment 224 and a second attachment point 232 proximate to the second end segment 226. The clip 214 is configured to be attached to the support sleeve 212 at the first and second attachment points 230, 232. In the illustrated embodiment, the support sleeve 212 includes a first tab 234 extending outward from the support sleeve 212 proximate to the first end segment 224. A portion of the first tab 234 is cutaway to illustrate a channel 236 extending through the first tab 234. Teeth 238 are provided in the channel 236 for interfacing with the clip 214.

The support sleeve 212 includes a second tab 240 extending from the support sleeve 212 proximate to the second end segment 226. The second attachment point 232 is defined by and/or provided on the second tab 240. The clip 214 extends from the second tab 240. The clip 214 is integrally formed with the second tab 240. Alternatively, the clip 214 may be separate from, and coupled to, the second tab 240.

In an exemplary embodiment, the support sleeve 212 is manufactured from a plastic or synthetic material, such as rubber. In the illustrated embodiment, the support sleeve 212 includes a backbone 242 extending between the first and second end segments 224, 226. A plurality of grooves 244 are formed in the support sleeve 212 along the intermediate segment 228. The grooves 244 define wall sections 246 that are separate from one another and spaced apart from one another. Each of the wall sections 246 are connected to the backbone 242. In an exemplary embodiment, the wall sections 246 are ring shaped to define the raceway 220. Optionally, adjacent wall sections 246 may have different heights. Having the wall sections 246 separate from one another, except at the backbone 242, provides flexibility in the support sleeve 212 and allows the support sleeve to be bent into the bent shape. For example, the support sleeve 212 may be bent until the portions of the wall sections 246 opposite the backbone 242 touch one another.

The clip 214 includes a body extending between a first end 250 and a second end 252. The second end 252 is formed integral with the second tab 240. The clip 214 includes one or more attachment features 254 at the first end 250. The attachment features 254 interface with the support sleeve 212 at the first attachment point 230, respectively, to secure the clip 214 to the support sleeve 212. In the illustrated embodiment, the attachment features 254 constitute teeth that are configured to be received in the channel 236 and engage the teeth 238. Other types of attachment features may be utilized in alternative embodiments to secure the clip 214 to the support sleeve 212.

During use, the first end 250 of the clip 214 is loaded through the channel 236. As the clip 214 is pulled through the channel 236, the teeth defining the attachment features 254 engage the teeth 238 to resist removal of the clip 214 from the channel 236. As the clip 214 is pulled further through the channel 236, the intermediate segment 228 is bent by closing the gaps between the wall sections 246. The clip 214 holds the support sleeve 212 in the bent shape. Optionally, the clip 214 can be released from the channel 236, allowing the support sleeve 212 to be straightened to the loading position.

Figure 5:
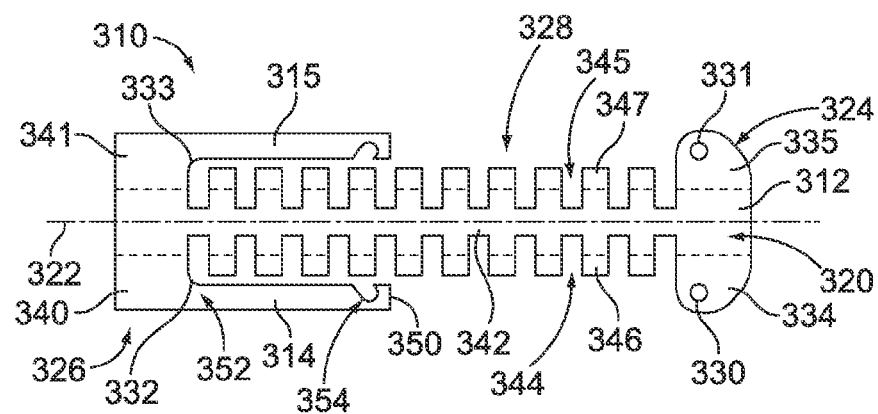

FIG. 5 is a side view of another alternative cable director 310. The cable director 310 includes a flexible support sleeve 312 and clips 314, 315 extending from the support sleeve 312. The support sleeve 312 is movable between a straight position (shown in FIG. 5) and a bent position (not shown). In the straight position, a fiber optic cable (not shown) is configured to be drawn through the support sleeve 312. In the bent position, the support sleeve 312 is bent at an angle, such as a 90° angle. The clips 314, 315 are used to hold the support sleeve 312 in the bent shape.

In the illustrated embodiment, the clips 314, 315 are integrally formed with the support sleeve 312. For example, the clips 314, 315 and the support sleeve 312 may be molded during a common molding process. The support sleeve 312 includes a raceway 320 (shown in phantom) extending through the support sleeve 312. The raceway 320 extends along a central longitudinal axis 322 between a first end segment 324 and a second end segment 326 of the support sleeve 312 at opposite ends of the support sleeve 312. An intermediate segment 328 extends between the first and second end segments 324, 326.

The support sleeve 312 is illustrated in a loading position, in which the support sleeve 312 is generally straight and has a cylindrical shape. In the loading position, the central longitudinal axis 322 extends along a generally linear path. The fiber optic cable may be passed straight through the support sleeve 312.

In an exemplary embodiment, the support sleeve 312 includes first attachment points 330, 331 proximate to the first end segment 324 and second attachment points 332, 333 proximate to the second end segment 326. The clips 314, 315 are permanently attached to the support sleeve 312 at the attachment points 332, 333, respectively. The clips 314, 315 are configured to be removably attached to the support sleeve 312 at the attachment points 330, 331, respectively. In the illustrated embodiment, the attachment points 330, 331 constitute pins, pegs, bars, or hooks extending from the support sleeve 312.

The clips 314, 315 are on opposite sides of the support sleeve 312 and the attachment points 330, 331 are also on opposite sides of the support sleeve 312. During use, either the clip 314 is attached to the support sleeve 312 at the attachment point 330 or the clip 315 is attached to the support sleeve 312 at the attachment point 331. The support sleeve 312 may be bent in two different directions and held by one of the clips 314, 315.

In the illustrated embodiment, the support sleeve 312 includes first tabs 334, 335 extending outward from the support sleeve 312 proximate to the first end segment 324. The attachment points 330, 331 are defined by and/or provided on the first tab 334. The support sleeve 312 includes second tabs 340, 341 extending from the support sleeve 312 proximate to the second end segment 326. The clips 314, 315 are integrally formed with the second tabs 340, 341, respectively. Alternatively, the clips 314, 315 may be separate from, and coupled to, the second tabs 340, 341.

In an exemplary embodiment, the support sleeve 312 is manufactured from a plastic or synthetic material, such as rubber. In an alternative embodiment, the support sleeve 312 may be manufactured from another material, such as a metal material. The support sleeve 312 includes backbones 342 extending between the first and second end segments 324, 326. A plurality of grooves 344 are formed in the support sleeve 312 along the intermediate segment 328 along one side of the backbones 342 and a plurality of grooves 345 are formed in the support sleeve 312 along the intermediate segment 328 along the opposite side of the backbones 342. The grooves 344, 345 define wall sections 346, 347, respectively, that are separate from one another and spaced apart from one another. The wall sections 346, 347 are connected to the backbones 342. In an exemplary embodiment, the wall sections 346, 347 are half-ring shaped to define complementary halves of the raceway 320. Having the wall sections 346, 347 separate from one another, except at the backbones 342, provides flexibility in the support sleeve 312 and allows the support sleeve to be bent into the bent shape. Having wall sections 346, 347 on both sides of the backbones 342 allows the support sleeve 312 to be bent in two different directions.

The clip 314 includes a body extending between a first end 350 and a second end 352. The second end 352 is formed integral with the second tab 340. The clip 314 includes one or more attachment features 354 at the first end 350. The attachment features 354 interface with the support sleeve 312 at the first attachment point 330 to secure the clip 314 to the support sleeve 312. In the illustrated embodiment, the attachment feature 354 constitutes a hook that is configured to be coupled to the pin (e.g. a separate piece that is coupled to the tab 334) or bar (e.g. an integral piece that is formed integrally with the tab 334) defining the attachment point 330. Other types of attachment features may be utilized in alternative embodiments to secure the clip 314 to the support sleeve 312. The clip 315 is substantially similar to the clip 314.

Figure 6:
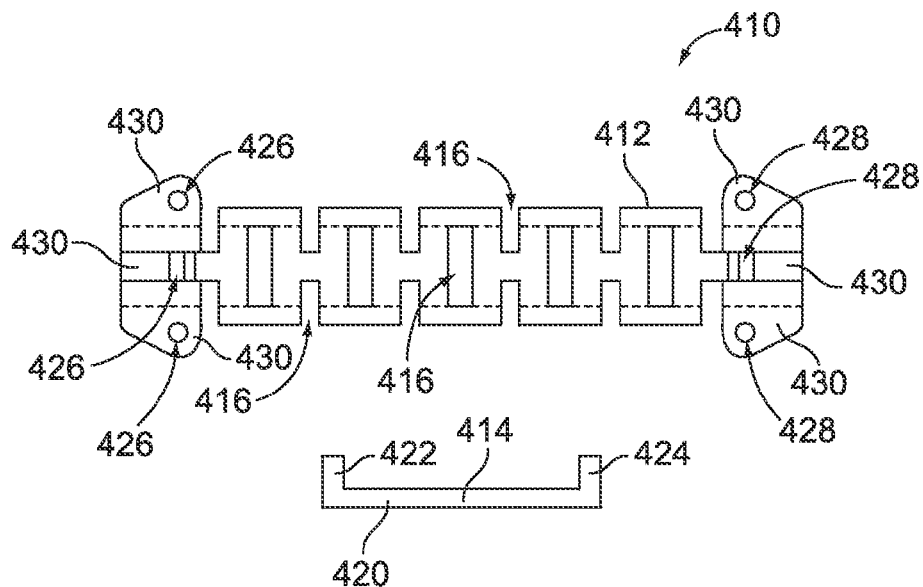

FIG. 6 is a side view of another alternative cable director 410. The cable director 410 includes a flexible support sleeve 412 and a clip 414 configured to be coupled to the support sleeve 412. The support sleeve 412 is movable between a straight position (shown in FIG. 6) and a bent position (not shown). In the straight position, a fiber optic cable (not shown) is configured to be drawn through the support sleeve 412. In the bent position, the support sleeve 412 is bent at an angle, such as a 90° angle. The clip 414 is used to hold the support sleeve 412 in the bent shape.

The cable director 410 is similar to the cable director 310 (shown in FIG. 5), however, the cable director 410 has the clip 414 and the support sleeve 412 separate from one another. Additionally, the support sleeve 412 includes grooves 416 formed therein. The grooves 416 are formed in a staggered pattern, alternating on four sides of the support sleeve 412, allowing the support sleeve 412 to be bent in four directions rather than two directions. For example, the grooves 416 are provided at 0° and 180°, which are staggered with grooves 416 at 90° and 270°. The clip 414 is configured to be connected to four sides of the support sleeve 412 to hold the support sleeve 412 at any of the four bent positions.

The clip 414 is similar to the clip 114 (shown in FIG. 2), however, the clip 414 is C-shaped having a central body 420 and arms 422, 424 at opposite ends of the body 420. The arms 422, 424 define attachment features of the clip 414. The arms 422, 424 are configured to be received in openings 426, 428, respectively, in the support sleeve 412. The openings 426, 428 define attachment points of the support sleeve 412. The openings 426, 428 are provided in tabs 430 extending outward from the end segments of the support sleeve 412. In the illustrated embodiment, the tabs 430 are provided at four different radial positions about the end segments of the support sleeve 412 (e.g. at 0°, 90°, 180° and 270°).

Figure 7:
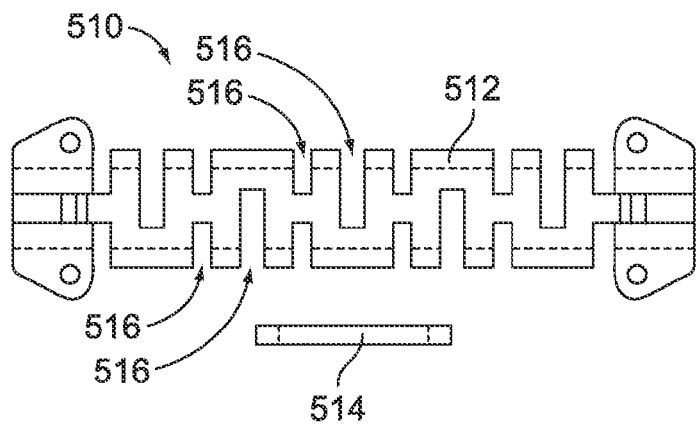

FIG. 7 is a side view of another alternative cable director 510. The cable director 510 includes a flexible support sleeve 512 and a clip 514 configured to be coupled to the support sleeve 512. The support sleeve 512 is movable between a straight position (shown in FIG. 7) and a bent position (not shown). In the straight position, a fiber optic cable (not shown) is configured to be drawn through the support sleeve 512. In the bent position, the support sleeve 512 is bent at an angle, such as a 90° angle. The clip 514 is used to hold the support sleeve 512 in the bent shape.

The cable director 510 is similar to the cable director 410 (shown in FIG. 6), however, the support sleeve 512 includes grooves 516 formed therein in a different pattern than in the cable director 410. The grooves 516 are formed in a staggered pattern, alternating on four sides of the support sleeve 512, allowing the support sleeve 512 to be bent in four directions rather than two directions. The grooves 516 are staggered at 0°, 90°, 180°, 270° and then the pattern repeats. In other words, the pattern of grooves 516 are formed in the bottom, right, top then left of the support sleeve 512, and then the pattern repeats. The clip 514 is configured to be connected to four sides of the support sleeve 512 to hold the support sleeve 512 at any of the four bent positions.

Figure 8:
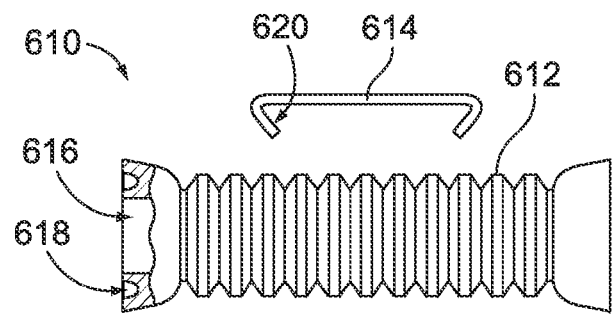

FIG. 8 is a side view of another alternative cable director 610. A portion of an end of the cable director 610 is cutaway to show internal features therein. The cable director 610 includes a flexible support sleeve 612 and a clip 614 configured to be coupled to the support sleeve 612. The support sleeve 612 is movable between a straight position (shown in FIG. 8) and a bent position (not shown). In the straight position, a fiber optic cable (not shown) is configured to be drawn through a raceway 616 in the support sleeve 612. In the bent position, the support sleeve 612 is bent at an angle, such as a 90° angle. The clip 614 is used to hold the support sleeve 612 in the bent shape.

The cable director 610 is similar to the cable director 110 (shown in FIG. 2), however, the support sleeve 612 defines a bellows having a flexible pleated configuration. The support sleeve 612 can be bent in any direction. The larger rings of the bellows limit the amount of bending, such as beyond 90° when the rings are folded in on one another.

In an exemplary embodiment, the ends of the support sleeve 612 have tabs that define circumferential channels 618 in the ends thereof. The circumferential channel 618 is illustrated at one of the ends in the cutaway portion of the support sleeve 612. The channel 618 entirely circumferentially surrounds the raceway 616. Alternatively, the channel 618 may only partially circumferentially surround the raceway 616. Multiple channels may be provided in each end rather than a continuous circumferential channel. The clip 614 includes attachment features 620 at the ends thereof in the form of hooks or fingers that are configured to be received in the channels at the ends of the support sleeve 612 to hold the support sleeve in the bent shape.

Figure 9:
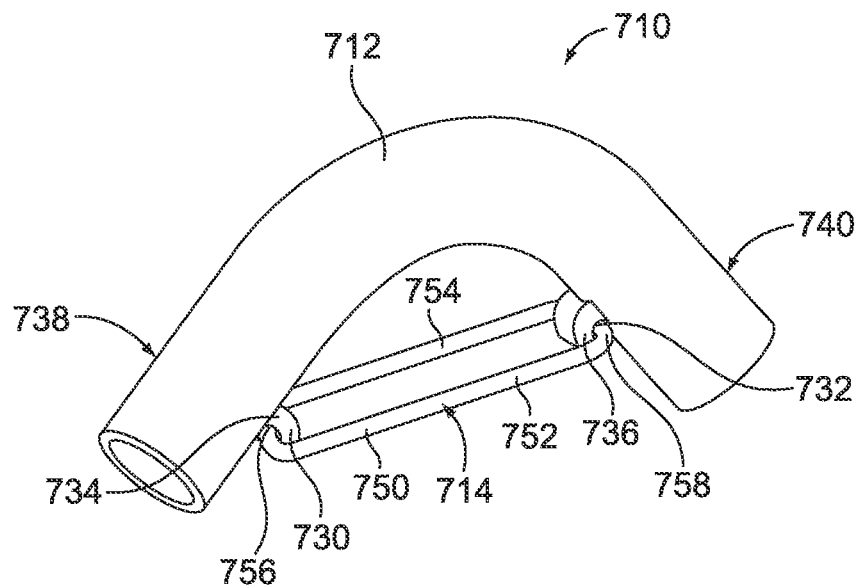

FIG. 9 is a side view of another alternative cable director 710. The cable director 710 includes a flexible support sleeve 712 and a clip 714 configured to be coupled to the support sleeve 712. The support sleeve 712 is movable between a straight position (not shown) and a bent position (shown in FIG. 9). In the straight position, a fiber optic cable (not shown) is configured to be drawn through the support sleeve 712. In the bent position, the support sleeve 712 is bent at an angle, such as a 90° angle. The clip 714 is used to hold the support sleeve 712 in the bent shape.

The cable director 710 is similar to the cable director 110 (shown in FIG. 3), however, the support sleeve 712 includes different types of attachment points 730, 732 than the cable director 110. The support sleeve 712 includes a first tab 734 and a second tab 736 that extend from first and second end segments 738, 740, respectively. The first tab 734 includes a hook defining the first attachment point 730. The second tab 736 includes a hook defining the second attachment point 732. The open sides of the hooks face outward away from one another. The hooks are provided on the underside of the support sleeve 712, such as along the interior portion of the curve.

The clip 714 differs from the clip 114 (shown in FIG. 1). The clip 714 includes a rectangular body 750 having an open interior. The body 750 may have other shapes in alternative embodiments, such as an oval shape, a C-shape or other shapes. The body 750 includes main arms 752, 754 and cross-beams 756, 758 at opposite ends of the main arms 752, 754. The cross-beams 756, 758 define attachment features of the clip 714. The cross-beams 756, 758 are configured to be received in the hooks defined by the first and second tabs 734, 736, respectively. The clip 714 holds the support sleeve 712 in the bent shape.

Figure 10:
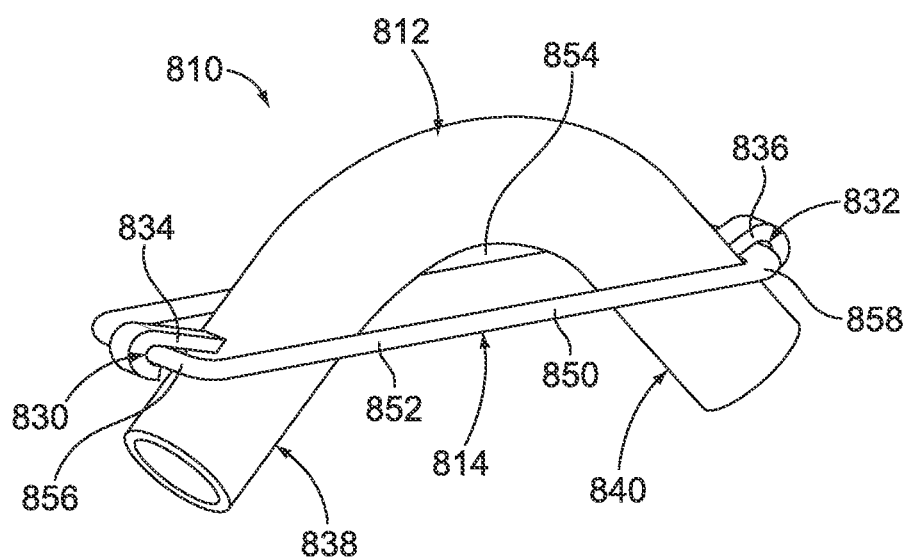

FIG. 10 is a side view of another alternative cable director 810. The cable director 810 includes a flexible support sleeve 812 and a clip 814 configured to be coupled to the support sleeve 812. The support sleeve 812 is movable between a straight position (not shown) and a bent position (shown in FIG. 10). In the straight position, a fiber optic cable (not shown) is configured to be drawn through the support sleeve 812. In the bent position, the support sleeve 812 is bent at an angle, such as a 90° angle. The clip 814 is used to hold the support sleeve 812 in the bent shape.

The cable director 810 is similar to the cable director 710 (shown in FIG. 9), however, the support sleeve 812 includes different types of attachment points 830, 832 than the cable director 710. The support sleeve 812 includes a first tab 834 and a second tab 836 that extend radially outward from first and second end segments 838, 840, respectively, rather than radially inward as with the first and second tabs 734, 736 (shown in FIG. 9). The first tab 834 includes a hook defining the first attachment point 830. The second tab 836 includes a hook defining the second attachment point 832. The open sides of the hooks face outward away from one another. The hooks are provided on the outside of the support sleeve 812, such as along the exterior portion of the curve.

The clip 814 differs from the clip 714 (shown in FIG. 9) in that the clip 814 is configured to extend around the outside of the support sleeve 812 rather than along the inside of the curve. The clip 814 includes a rectangular body 850 having an open interior. The body 850 may have other shapes in alternative embodiments, such as an oval shape, a C-shape or other shapes. The body 850 includes main arms 852, 854 and cross-beams 856, 858 at opposite ends of the main arms 852, 854. The cross-beams 856, 858 define attachment features of the clip 814. The cross-beams 856, 858 are configured to be received in the hooks defined by the first and second tabs 834, 836, respectively. During assembly, the clip 814 is placed over the support sleeve 812. The clip 814 holds the support sleeve 812 in the bent shape.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A fiber optic cable assembly comprising:
a connector having a mating end and a cable end;
a fiber optic cable terminated to the cable end of the connector; and
a cable director discrete from the fiber optic cable and coupled to the fiber optic cable rearward of the connector, the cable director comprising a flexible support sleeve movable along the fiber optic cable and a clip extending from the support sleeve, the support sleeve including a raceway that receives the fiber optic cable and allows the fiber optic cable to be fed through the support sleeve, the support sleeve having a first end segment and a second end segment, the support sleeve having a first tab having dimples defining a first attachment point proximate to the first end segment and a second tab having dimples defining a second attachment point proximate to the second end segment, the clip having fingers engaging the dimples, the clip being rotatable about the dimples, the support sleeve being held in a bent shape when the clip is attached to both the first attachment point and the second attachment point, the support sleeve being configured to be straightened to a loading position in which the raceway is substantially linear when the clip is removed from at least one of the first or second attachment points, the support sleeve movable along the fiber optic cable when the support sleeve is straightened and in the loading position.

2. The fiber optic cable assembly of claim 1, wherein the support sleeve is held at approximately a 90° angle when the clip is attached to both the first attachment point and the second attachment point.

3. The fiber optic cable assembly of claim 1, wherein the fiber optic cable is drawn straight through the raceway when the support sleeve in the loading position.

4. The fiber optic cable assembly of claim 1, wherein the support sleeve is tubular in shape with the raceway extending along a central longitudinal axis, the central longitudinal axis being substantially linear in the loading position, the central longitudinal axis being bent along a non-linear path in the bent shape.

5. The fiber optic cable assembly of claim 1, wherein the support sleeve includes a plurality of grooves formed therein allowing the support sleeve to flex between the bent shape and the straightened loading position.

6. The fiber optic cable assembly of claim 1, wherein the support sleeve includes tabs at the first and second attachment points, the clip engaging the tabs to hold the support sleeve in the bent shape.

7. The fiber optic cable assembly of claim 1, wherein the clip is integrally formed with the support sleeve, the clip includes a fixed end permanently attached to the second attachment point, the clip includes a free end removably attached to the first attachment point.

8. The fiber optic cable assembly of claim 1, wherein the clip has a length extending between a first end and a second end, the length defining a radius of curvature of the support sleeve in the bent shape.

9. The fiber optic cable assembly of claim 1, wherein the cable director is positionable along the fiber optic cable remote from the connector.

10. The fiber optic cable assembly of claim 1, wherein the clip is variably positionable relative to the support sleeve to change a radius of curvature of the bent shape of the support sleeve.

11. The fiber optic cable assembly of claim 1, wherein the clip has multiple connection points to change an effective length of the clip between the first and second attachment points to change a radius of curvature of the bent shape of the support sleeve.

12. The fiber optic cable assembly of claim 1, wherein at least one of the first and second attachment points includes an opening, the clip including a body passing through the opening.

13. A fiber optic cable assembly comprising:
a connector having a mating end and a cable end;
a fiber optic cable terminated to the cable end of the connector; and
a cable director coupled to the fiber optic cable rearward of the connector, the cable director comprising a flexible support sleeve and a clip extending from the support sleeve, the clip being variably positionable relative to the support sleeve to change a radius of curvature of the bent shape of the support sleeve, the support sleeve including a raceway that receives the fiber optic cable, the support sleeve being movable between a loading position and a holding position, the raceway being substantially linear in the loading position, the raceway being bent at an angle in the holding position, the clip being movable between an engaged position and a disengaged position, the clip retaining the support sleeve in the holding position when in the engaged position.

14. The fiber optic cable assembly of claim 13, wherein the support sleeve has a first end segment and a second end segment, the support sleeve having a first attachment point proximate to the first end segment and a second attachment point proximate to the second end segment, the first end of the clip being permanently fixed to the support sleeve at the first attachment point and the second end of the clip being removably coupled to the support sleeve at the second attachment point in the engaged position, the second end of the clip being removed from the second attachment point in the disengaged position.

15. The fiber optic cable assembly of claim 13, wherein the support sleeve is held at approximately a 90° angle in the holding position.

16. The fiber optic cable assembly of claim 13, wherein the support sleeve is tubular with the raceway extending along a central longitudinal axis, the central longitudinal axis being substantially linear in the loading position, the central longitudinal axis being bent along a non-linear path in the holding position.

17. A cable director for a fiber optic cable comprising:
a flexible support sleeve including a raceway configured to receive the fiber optic cable and allow the fiber optic cable to be fed through the support sleeve, the support sleeve having a first end segment and a second end segment, the support sleeve having a first attachment point proximate to the first end segment and a second attachment point proximate to the second end segment, at least one of the first and second attachment points includes an opening; and
a clip extending from the support sleeve, the clip including a body passing through the opening, the clip holding the support sleeve in a bent shape when the clip is attached to both the first attachment point and the second attachment point, wherein the support sleeve is configured to be straightened to a loading position in which the raceway is substantially linear when the clip is removed from at least one of the first or second attachment points, the support sleeve movable along the fiber optic cable when the support sleeve is straightened and in the loading position.

18. The cable director of claim 17, wherein the support sleeve is held at approximately a 90° angle when the clip is attached to both the first attachment point and the second attachment point.

19. The cable director of claim 17, wherein the support sleeve is tubular in shape with the raceway extending along a central longitudinal axis, the central longitudinal axis being substantially linear in the loading position, the central longitudinal axis being bent along a non-linear path in the bent shape.

\* \* \* \* \*